March 16, 1943.  W. C. HALL, JR., ET AL  2,313,938
FREQUENCY DOUBLER DEVICE
Filed Oct. 18, 1941

INVENTORS
WILLARD C. HALL, JR. & EVERETT L. LeGETTE

ATTY.

Patented Mar. 16, 1943

2,313,938

UNITED STATES PATENT OFFICE 2,313,938

FREQUENCY DOUBLER DEVICE

Willard C. Hall, Jr., and Everett L. Le Gette, Los Angeles, Calif., assignors to Alfred P. Daniels, Los Angeles, Calif.

Application October 18, 1941, Serial No. 415,558

8 Claims. (Cl. 172—281)

This invention relates to means for changing the frequency of electrical power systems without using moving parts. Transformer means are employed in cooperation with a current rectifier and designed in a manner to double the frequency of the current imput.

This invention works very satisfactory when a three limbed transformer is used, or its equivalent which may be readily formed with a plurality of transformers, the central limb having the primary or exciting coil and each of the other two limbs an output coil and also a winding that may be termed a converter coil since it operates in conjunction with a rectifier to convert a normal half primary cycle into a full output cycle. Although each converter coil may have its own rectifier, it is preferable to use a single rectifier for both coils, the rectifier in this case having the usual three terminals, one at the neutral two way junction of the rectifier and one each at the opposite direct current ends. The two output coils are connected 180° out of phase.

The rectifier operates to short one of its connected coils each positive half primary cycle and its other coil each negative half primary cycle. The rectifier also induces a D. C. component in the iron circuit. When this direct current is present, the alternating current component, then rising in the primary, causes molecular oscillations which actually produce the multi-frequency. Under these conditions a positive half primary cycle would greatly strengthen the core flux on the side of the transformer having its converter coil shorted through the rectifier, thus forcing the output coil on the same transformer side to dominate the weaker output coil on the other side of the transformer and causing the current in this weaker coil to become negative in direction. The next primary half cycle is negative and this shorts the converter coil on the former weaker side of the transformer; this side now strengthens along with its companion output coil, which latter coil dominates the positive output coil so as to create a full output cycle for the negative half primary cycle in the same manner as explained for the positive transformer side.

An object of the invention is to provide a dependable frequency changing unit that is simple in construction and economical to manufacture.

Another object is to provide a frequency changer without mechanical moving parts that operates at a high efficiency.

Still another object is to present a frequency changing device that can be coupled with other similar devices, each subsequent device doubling the frequency of its precedent device.

Other objects, advantages and features of our invention will appear from the accompanying drawing, the subjoined detailed description, the preamble of these specifications, and the appended claims.

Applicants are about to illustrate and describe one of the forms of their invention in order to teach one how to make, use and vend the same, but it is to be understood that the drawing and description thereof are not to limit the invention in any sense whatsoever, except as limited by the appended claims.

Figure 1:
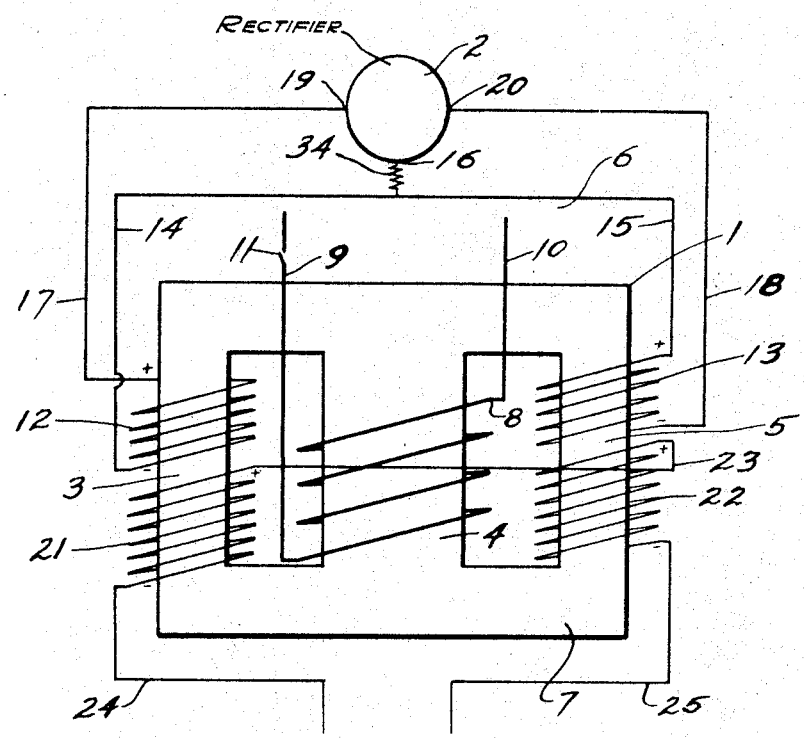
Fig. 1 shows a wire diagram of the invention.

The reference character 1 indicates a transformer and the numeral 2 a rectifying unit. The transformer has a plurality of limbs 3, 4, 5, 6 and 7 of laminated iron sheets joined together to form the three legged transformer shown. The large cross sectional area central limb is provided with the primary coil 8 having end leads 9 and 10 which lead to a suitable source of pulsating or alternating electric current through the hand switch indicated at 11.

The coils 12 and 13 are wound upon the limbs 3 and 5 respectively, and these coils are regulating windings or flux control coils. Their in phase ends having the leads 14 and 15 respectively which connect with the terminal 16 of the biphase junction type rectifier 2. The other ends of these coils 12 and 13 have the leads 17 and 18 respectively which connect with the terminals 19 and 20 of the rectifier. These coils may be called the rectifier coils or converter coils, or control coils since they regulate the action of the output coils.

Also, on the limbs 3 and 4 are the output coils 21 and 22 having their opposing ends connected together by the conductor 23. The other ends of these output coils are connected to the output conductors 24 and 25 which lead to any kind or type of load not shown.

Figure 2:
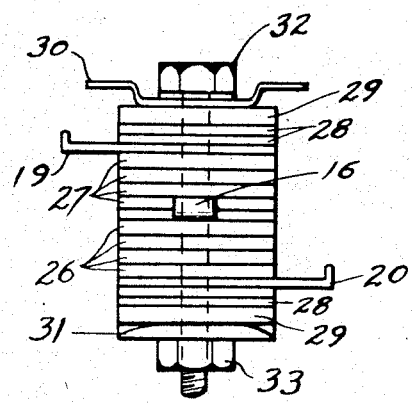
Fig. 2 shows a side elevation of a rectifier useful in this invention.

The rectifier 2 may be any suitable type of rectifier, but in this particular illustration, the metallic oxide pile is utilized and has been found satisfactory for practical purposes. In Fig. 2 such a rectifier is illustrated and comprises a plurality of discs 26 and 27 which have one side coated with a current valve compound, such as iron oxide, for instance, that has the property of permitting current to pass only in one direction therethrough. The discs 26, in this particular showing being copper, have the compound upon their bottom surfaces and lead separator discs on their top surfaces. The copper discs 27 are reversed so that the oxide compound is on their top surfaces. At the neutral point, the terminal 16 is provided and at the ends of the pile are the terminals 19 and 20. The end insulating discs 28 and end steel caps 29 are provided to strengthen the rectifier and receive the end bracket 30 and lock washer 31. An insulated bolt 32 passes through all the discs, bracket and lock washer and has on its end the nut 33. This nut is tightened upon the bolt to tightly squeeze all the discs together.

Figure 3:
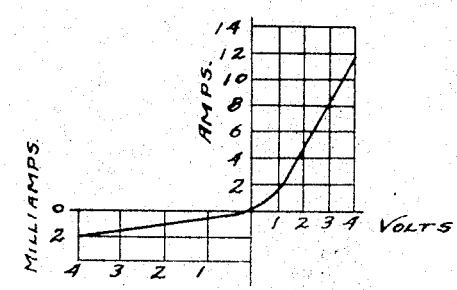
Fig. 3 shows the current characteristics of the rectifier of Fig. 2.

Fig. 3 shows the current characteristics of the rectifier just explained. Note that the current in either direction from the neutral point 16 of the rectifier, is directly proportional from about 2 amperes upwards to 12 amperes. The reverse current is very low and amounts to about 2 milliamperes at 4 volts. This type of rectifier in conjunction with the coil arrangement shown, results in a very good sine wave output without any sign of the fundamental wave.

A small resistance 34, of about 20 ohms, is provided between the wires 14—15 and the terminal 16 for the purposes of causing the voltage wave form to nearly conform with the current output wave form of the rectifier. With an inductive load upon the rectifier, the voltage wave form is little changed and hence somewhat reduces the efficiency of the rectifier.

Having thus described our invention, what is claimed as new and desired to be secured by Letters Patent is:

1. In a device for raising the frequency of electric current, a transformer core having a limb with a primary winding, and a plurality of limbs each of which has a regulator winding and an output coil, said output coils having a series connection and their free ends adapted to be connected with a load, said regulator windings having ends leading to a rectifier and connected thereto so that only one regulator winding can be shorted at any half cycle of the primary flux through the core.

2. A device for increasing the frequency of electric currents, a transformer having a core with a plurality of spaced apart limbs joined to form a flux path, a primary coil on one of the limbs, an output coil and a control winding on each of the other limbs, valve means to short and open the winding on each of said other limbs alternately and cause a full cycle minor wave of current in the output coils for each half cycle of major wave of current in the primary coil.

3. The device set forth in claim 2 wherein the control winding of each other limb of the core are connected in phase and the output coils are connected out-of-phase.

4. The device set forth in claim 2 wherein the output coils are connected in series and said means is a bivalve current rectifier.

5. A frequency changer for electric currents comprising a three limbed transformer having a primary coil on one limb and a pair of coils on each of the other limbs, each pair of coils consisting of a control winding and an output winding, the control winding of each limb having an inphase connection and the output winding of each limb having an out-of-phase connection, and valve means for alternately shorting the control winding on each limb to create a full wave of flux through the core for each half wave of flux set up by the current in the primary coil.

6. The device set forth in claim 5 wherein the valve means is a rectifier balanced between and connected to the regulator windings.

7. A device for doubling the frequency of an alternating current, the device comprising a three limbed transformer core having a central limb with a primary winding and side outer limbs with secondary windings, a valve means, the secondary windings comprising a pair of coils on each side limb, one of the pair of coils of each side limb having end leads to be connected to a load, and the other coil of each pair having the said valve means connected across the end leads thereof.

8. In a device for changing the frequency of electric currents, a transformer means having a plurality of flux paths with primary and secondary coils, the secondary coils comprising winding sets, each set including an output coil and a control coil, means to short and open the control coils in sequence to cause a full cycle minor wave of current in the output coils for each half cycle of major wave of current in the primary of the transformer.

WILLARD C. HALL, Jr.
EVERETT L. LE GETTE.